United States Patent [19]

Hirose

[11] Patent Number: 5,258,846
[45] Date of Patent: Nov. 2, 1993

[54] CCD IMAGER INCLUDING SERIALLY CONNECTED INVERTER CIRCUITS CONNECTED IN PARALLEL TO CHARGE TRANSFER ELEMENTS

[75] Inventor: Satoshi Hirose, Itami, Japan

[73] Assignee: Mitsubishi Denki Kabushiki Kaisha, Tokyo, Japan

[21] Appl. No.: 649,961

[22] Filed: Feb. 4, 1991

[30] Foreign Application Priority Data

Feb. 5, 1990 [JP] Japan ................................. 2-24436
Sep. 20, 1990 [JP] Japan ............................... 2-252710

[51] Int. Cl.$^5$ ......................... H04N 3/14; H04N 5/335
[52] U.S. Cl. .......................... 358/213.29; 356/213.23; 356/213.31; 356/213.26
[58] Field of Search ............... 358/213.31, 213.29, 358/213.27, 213.26, 213.23

[56] References Cited

U.S. PATENT DOCUMENTS

| | | | |
|---|---|---|---|
| 4,011,402 | 3/1977 | Koike et al. | 358/213.31 |
| 4,339,672 | 7/1982 | Sato | 307/270 |
| 4,551,757 | 11/1985 | Ohkubo et al. | 358/213.31 |
| 4,799,109 | 1/1989 | Esser et al. | 358/213.26 |
| 4,821,105 | 3/1989 | Suga et al. | 358/213.31 |
| 4,862,275 | 8/1989 | Meisenzahl | 358/213.29 |
| 5,105,450 | 4/1992 | Yamada | 358/213.26 |

FOREIGN PATENT DOCUMENTS 63-155962 6/1988 Japan.

OTHER PUBLICATIONS

Theuwissen et al., "the Accordion ... Image Sensor", Philips Technical Review, vol. 43, No. 1/2, 1986, pp. 1-8.

Primary Examiner—Michael T. Razavi
Assistant Examiner—Wendy R. Greening
Attorney, Agent, or Firm—Leydig, Voit & Mayer

[57] ABSTRACT

A CCD imager includes a plurality of photoresponsive elements producing signal charges in response to light, a plurality of scanning charge transfer elements, each having a gate electrode, for receiving signal charges from the photoresponsive elements and for transferring the signal charges, and a plurality of serially connected inverter circuits, the outputs of respective inverter circuits being connected to corresponding gate electrodes of the charge transfer elements. The charge transfer is completed within the delay times of the inverters so that the charge transfer for all scanning elements can be completed without the mixing of charges from potential wells beneath adjacent gate electrodes.

11 Claims, 10 Drawing Sheets

→ output side

| time | ø6 | ø5 | ø4 | ø3 | ø2 | ø1 | |
|------|----|----|----|----|----|----|---|
| t1 | L | H | L | H | L | H | L |
| t2 | L | H | L | H | L | H | Ⓗ |
| t3 | L | H | L | H | L | Ⓛ | H |
| t4 | L | H | L | H | Ⓗ | L | Ⓛ |
| t5 | L | H | L | Ⓛ | H | Ⓗ | L |
| t6 | L | H | Ⓗ | L | Ⓛ | H | Ⓗ |
| t7 | L | Ⓛ | H | Ⓗ | L | Ⓛ | H |

| ØIN | ØA | ØB | Ø1 | Ø2 | Ø3 | Ø4 | Ø5 | Ø6 |
|---|---|---|---|---|---|---|---|---|
| L | L | H | H | L | H | L | H | L |
| L | H | L | H | L | H | L | H | L |
| L | L | H | H | L | H | L | H | L |
| H | H | L | (L) | L | H | L | H | L |
| H | L | H | L | (H) | H | L | H | L |
| L | H | L | (H) | H | (L) | L | H | L |
| L | L | H | H | (L) | L | (H) | H | L |
| H | H | L | (L) | L | (H) | H | (L) | L |
| H | L | H | L | (H) | H | (L) | L | (H) |
| L | H | L | (H) | H | (L) | L | (H) | H |
| L | L | H | H | (L) | L | (H) | H | (L) |
| H | H | L | (L) | L | (H) | H | (L) | L |
| H | L | H | L | (H) | H | (L) | L | (H) |

CCD IMAGER INCLUDING SERIALLY CONNECTED INVERTER CIRCUITS CONNECTED IN PARALLEL TO CHARGE TRANSFER ELEMENTS

FIELD OF THE INVENTION

The present invention relates to a CCD imager, and more particularly to a construction of a driving circuit therefor.

BACKGROUND OF THE INVENTION

Figure 5:
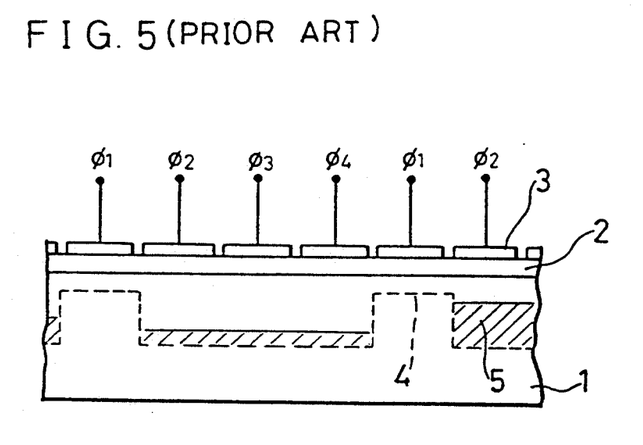
FIG. 5 is a cross-sectional view showing a conventional four-phase driving system CCD imager.

A construction of a conventional CCD imager will be described with reference to FIGS. 5 to 7. FIG. 5 is a cross-sectional view showing a construction of a conventional CCD imager and FIG. 7 is a plan view showing the device of FIG. 5.

Figure 6:
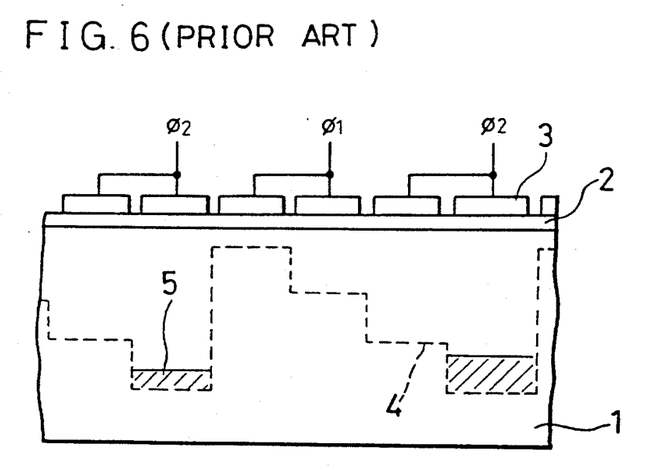
FIG. 6 is a cross-sectional view showing a conventional two-phase driving system CCD imager.

In FIGS. 5 and 6, the conventional CCD imager is constituted by a semiconductor substrate 1, a silicon dioxide film 2 produced on the semiconductor substrate 1, and polycrystalline silicon gates 3 produced on the silicon dioxide film 2. In the figure drawn in the semiconductor substrate 1, reference numeral 4 designates a potential barrier against electron flow and reference numeral 5 designates signal charges. In FIG. 7, reference numeral 3 designates a polycrystalline silicon gate and reference numeral 6 designates a photodiode.

Figure 7:
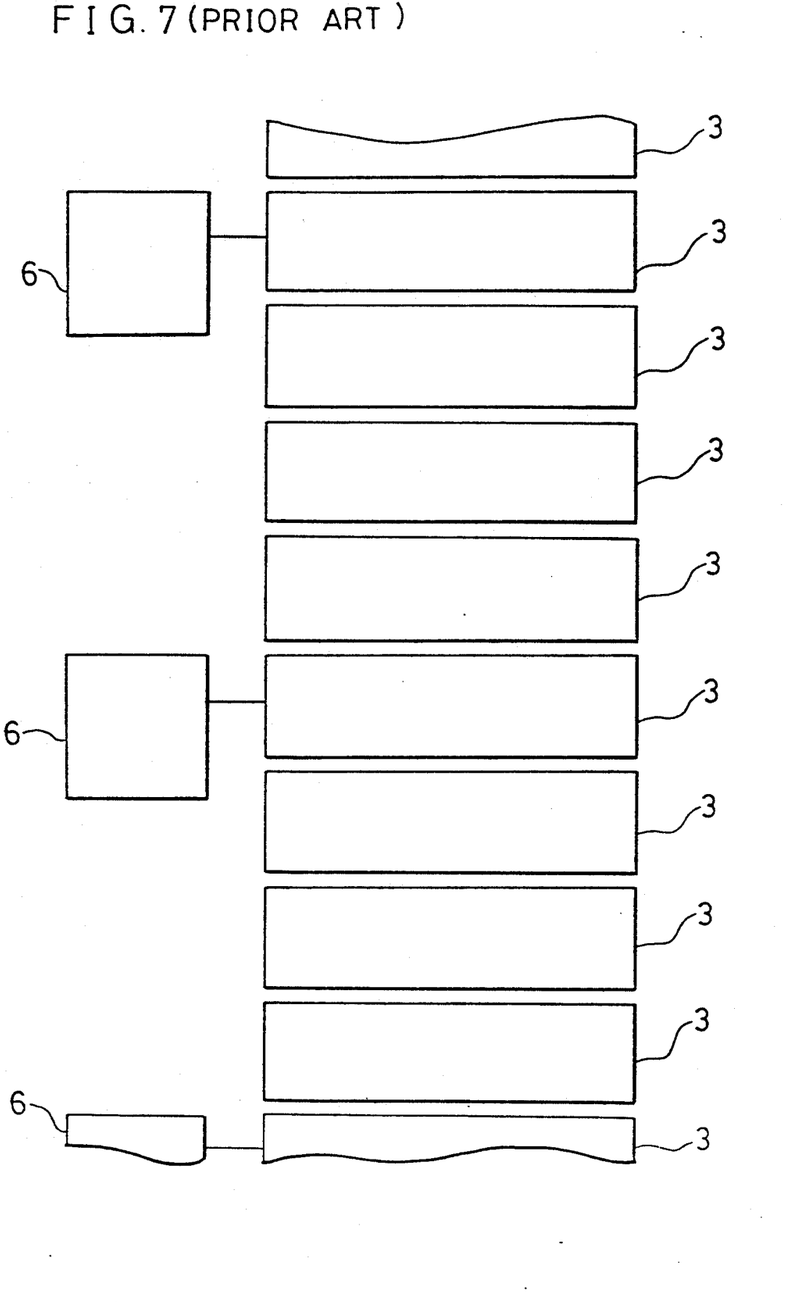
FIG. 7 is a plan view of the CCD imager shown in FIG. 5.

As is understood from FIGS. 5 to 7, in order to transfer charges stored at the photodiode 6, the number of CCD transfer gates required for one photodiode is "4". That is, when constructing an imager using a two-phase or four-phase driving system CCD, four gates are required to carry out the transfer of charges and if the number of gates is less than that, mixing of charges occurs. Also, in a three-phase driving system CCD, three gates are required to carry out the transfer of charges. The two-phase driving system is most generally used because only two kinds of input clocks are required.

In an imager, it is desirable that the density of pixels increase and it is preferred that the number of CCD transfer gates be reduced compared to the increase in the number of pixels. With these goals in mind, a new CCD driving system is proposed in an article by A. J. P. Theuwissen et al, "The Accordion Imager: an Ultra High Density Frame Transfer CCD", IEDM 84, Lec.-No.2.6, Prescripts pp. 40 to 43.

Figure 8A:
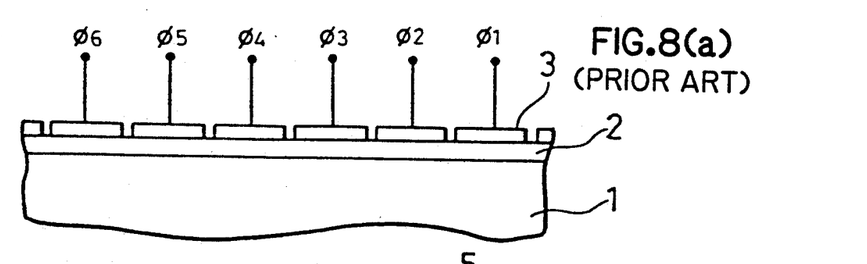
Figure 8B:
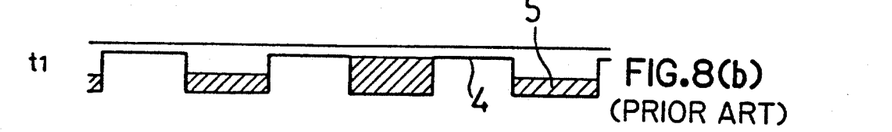
Figure 8C:
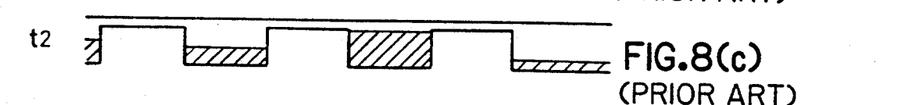
Figure 8D:
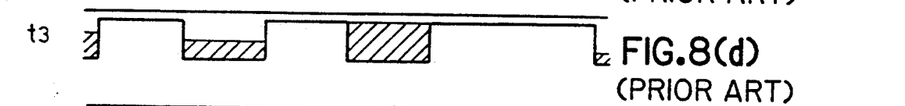
Figure 8E:
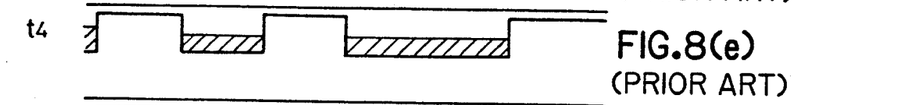
Figure 8F:
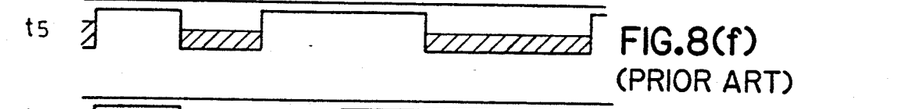
Figures 8G, 8H:
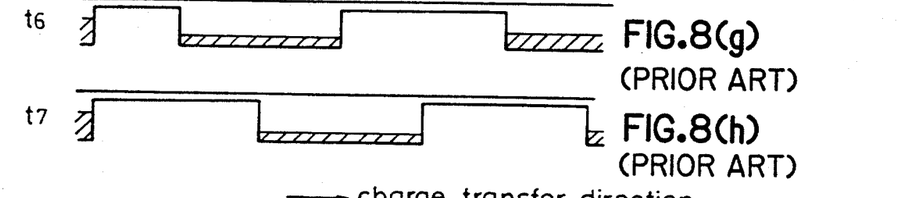

FIGS. 8(a)–8(n) show a structure and a manner driving of the accordion system CCD device described in that article. In FIGS. 8(b)–8(h), potentials at times $t_1$ to $t_7$, respectively, are shown. At time $t_1$, charges exist at all potential wells. That is, two gate electrodes are provided corresponding to signal charges stored at one photodiode and this structure is very advantageous for integration of photodiodes. When the transfer is started after time $t_2$, charges successively move from the output side.

Figure 9:
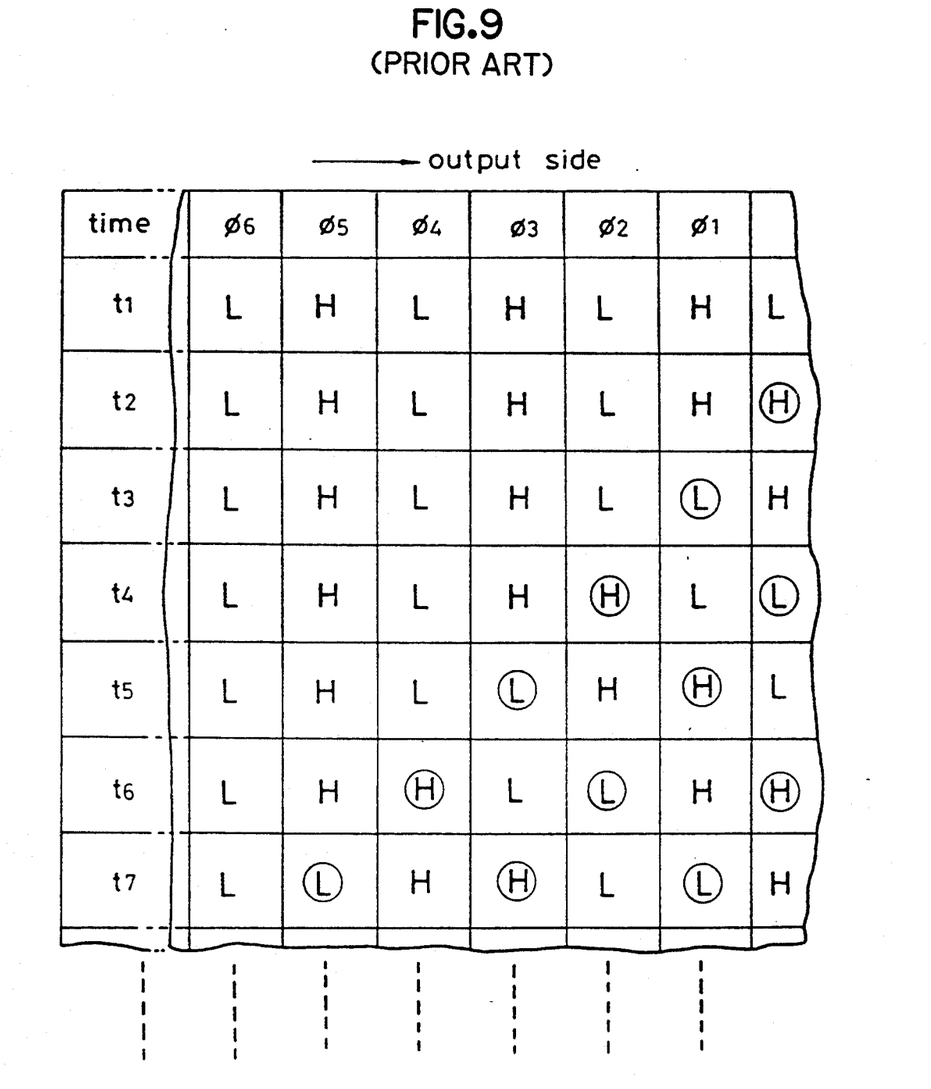
FIG. 9 is a diagram showing clock inputs for realizing the operation of the CCD shown in FIG. 9.

FIG. 9 shows clock inputs for realizing the operation shown in FIGS. 8(b)–8(n). In FIG. 9, high and low voltages are alternatingly applied to respective electrodes at time $t_1$ and in correspondence with the advance of time as $t_2$, $t_3$, ..., the clocks applied to respective electrodes are successively inverted from the output side. Shift registers connected to respective electrodes include a circuit as shown in FIG. 10, that is, a CMOS inverter 14 including P and N channel transistors 15 and 16, respectively, and an N channel transistor 17 connected to the input terminal of the inverter 14.

Figure 10:
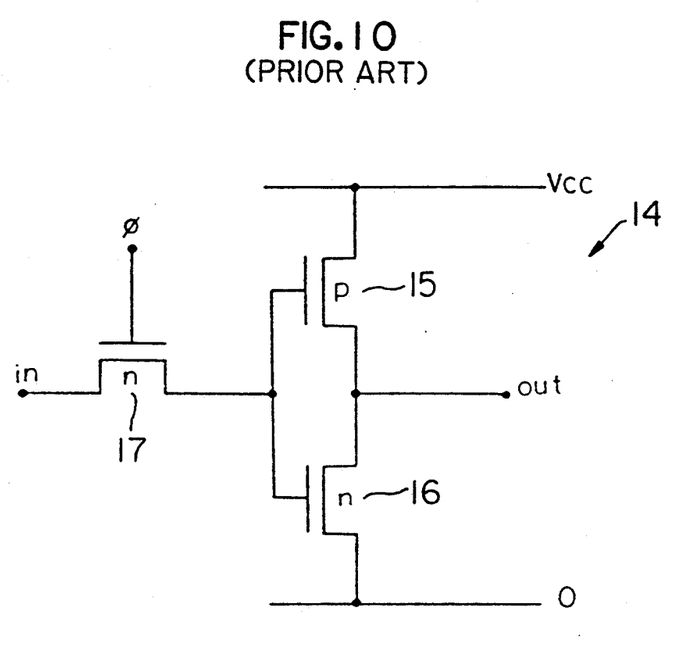
FIG. 10 is a diagram showing shift registers used in the conventional CCD imager.
Figure 11A:
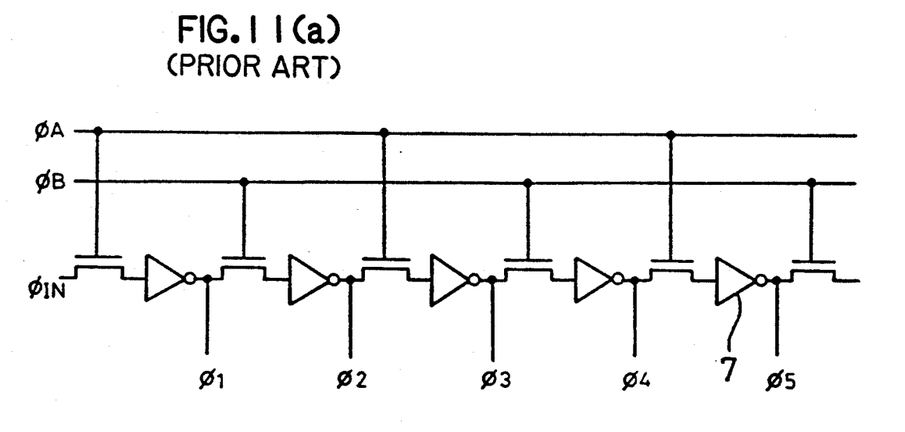
FIG. 11(a) is a schematic diagram and FIG. 11(b) is a diagram of clock inputs for a conventional CCD imager.
Figure 11B:
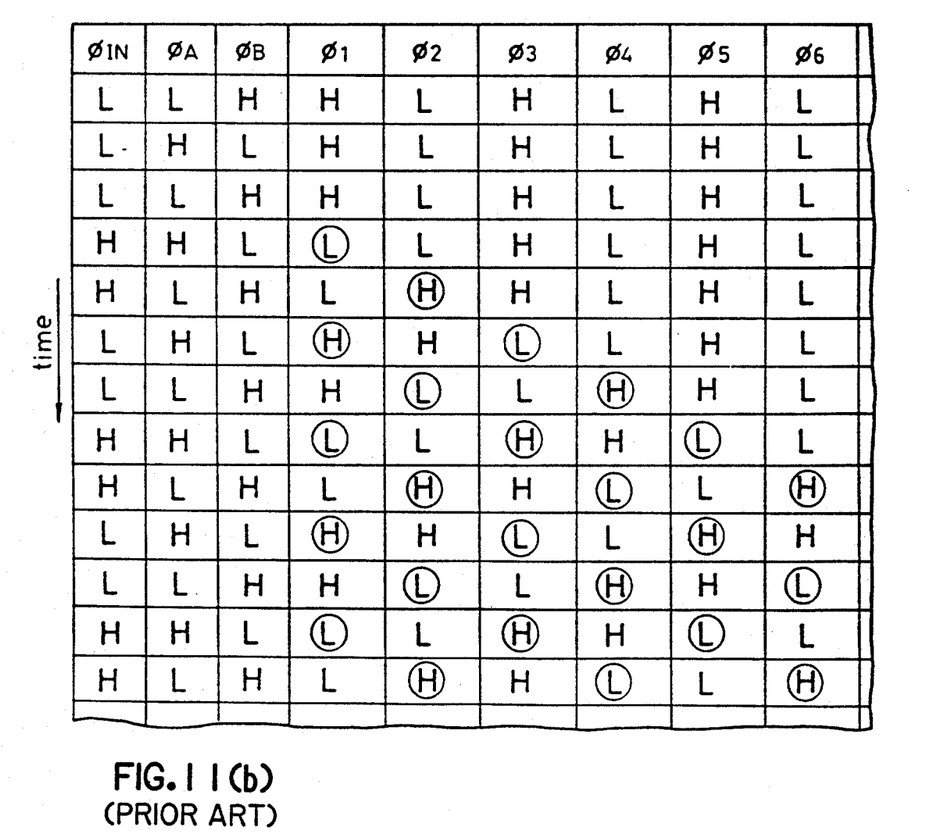

FIG. 11(a) shows a circuit diagram in which the circuit of FIG. 10 is connected as is actually used. In FIG. 11(b) while in the stationary state where input clocks $\phi_{IN}$ do not change, the voltages on the electrodes after the input clock $\phi_{IN}$ are regularly and alternatingly high(H) or low(L), when the input clock $\phi_{IN}$ changes from H to L or from L to H, the change is transferred as a voltage change of the electrode after the clock $\phi_1$ in synchronization with the two driving clocks $\phi_A$, $\phi_B$. It is possible to realize the potential distribution shown in FIGS. 8(b)–(n) by using these clock inputs. In FIG. 11(b), the L or H clock whose voltage is changed is surrounded by a circle (○) in order to clarify the transfer of the voltage change.

The conventional CCD imager is constructed as described above, and clocks $\phi_A$, $\phi_B$ for driving the shift registers, the switching transistors and inverters corresponding to respective electrode gates are required, thereby complicating the circuit construction.

SUMMARY OF THE INVENTION

The present invention is directed to solving the above-described problems and has for its object the provision of a CCD imager having a simplified circuit construction.

Other objects and advantages of the present invention will become apparent from the detailed description given hereinafter; it should be understood, however, that the detailed description and specific embodiment are given by way of illustration only, since various changes and modifications within the spirit and the scope of the invention will become apparent to those skilled in the art from this detailed description.

In accordance with the present invention, a plurality of inverters are serially connected, output terminals of respective inverters are connected to the corresponding gate electrodes of the charge transfer device. Charge transfer is completed in the delay time of an inverter output after the input of the input signal thereto. Therefore, the charge transfer for all stages can be completed without mixing of charges in adjacent potential wells in a simple circuit construction.

BRIEF DESCRIPTION OF THE DRAWINGS

FIG. 1(a) is a diagram showing a construction and FIG. 1(b)–1(g) show operation waveforms of a CCD imager in accordance with an embodiment of the present invention;

FIG. 2(a) is a diagram showing a structure.

FIG. 8(a) is a diagram showing a construction and FIGS. 8(b)–8(h) illustrate the manner driving of a conventional accordion CCD imager;

DETAILED DESCRIPTION OF THE PREFERRED EMBODIMENTS

An embodiment of the present invention will be described in detail with reference to the drawings.

Figure 1:
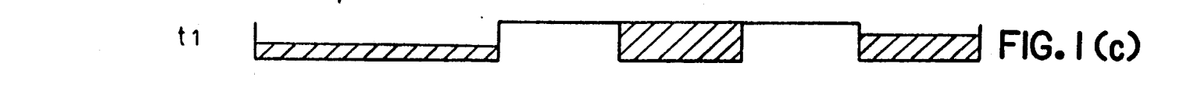
Figure 12:
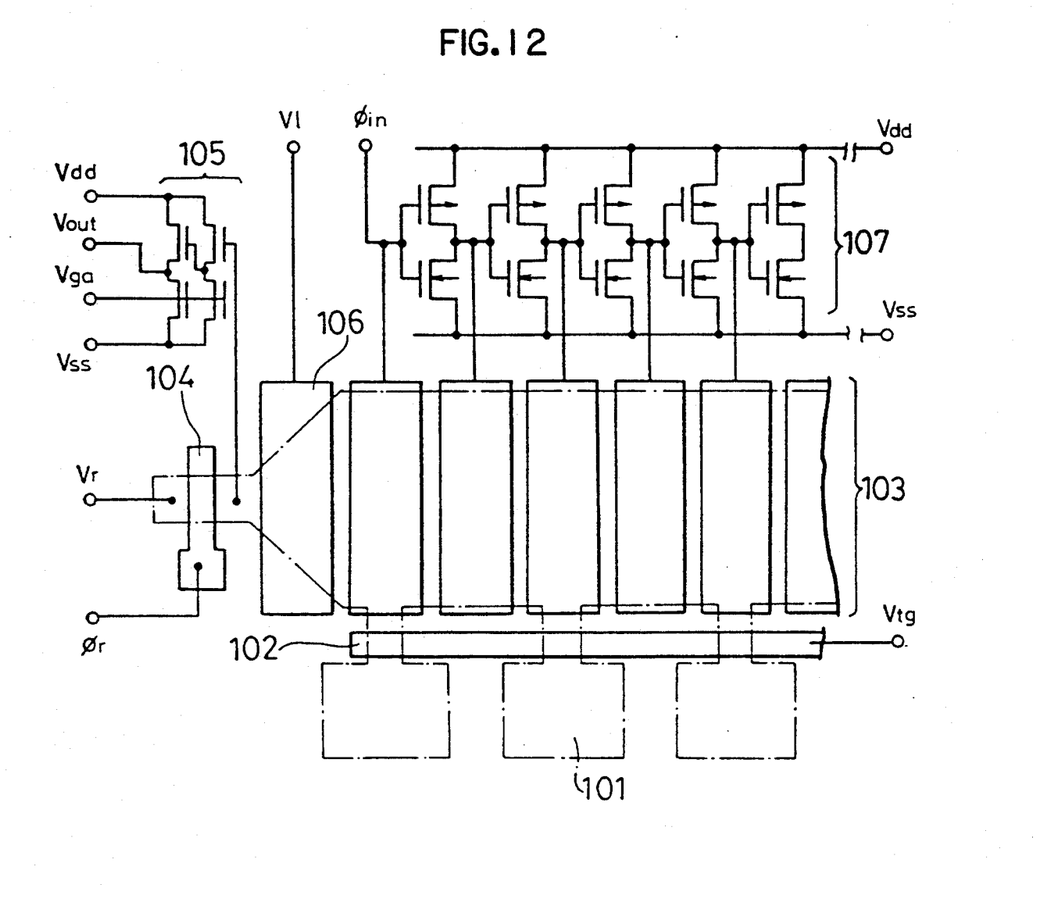
FIG. 12 is a diagram showing a detailed construction of the CCD imager shown in FIG. 1.

FIG. 1(a) shows a construction of a CCD imager in accordance with a first embodiment of the present invention and FIG. 1(b)-1(g), shows an operation diagram thereof. The construction of the device will be described in detail with reference to FIG. 12. In FIG. 12, reference numeral 101 designates a photodiode and numeral 103 designates a CCD. A transfer gate 102 is provided between the photodiodes 101 and the CCDs 103 for storing and transferring signal charges generated by the photodiodes 101 to the CCDs 103. A reset gate 104 is provided at an end of the sequence of CCDs 103 and a floating diffusion amplifier 105 (hereinafter referred to as "FDA") is connected to the end of the CCD sequence 103 between the CCD sequence 103 and the reset gate 104. A final gate 106 is provided at the end of the CCD sequence 103 before the reset gate 104 and the connection to the FDA 105. CMOS inverter circuits 107 are connected in series and respective nodes of connected input and output terminals of a pair of inverter circuits 107 are connected in parallel to respective CCDs in the sequence 103. Reference character $V_{out}$ designates a signal output. Reference character $V_{dd}$ designates a power supply input and reference character $V_{ss}$ designates a ground input. Reference character $V_{ga}$ designates a gate input to the FDA driving the transistors of the FDA. Reference character $V_r$ designates a reset potential and reference character $\phi_r$ designates a reset input. Reference character $\phi_{in}$ designates an input clock and reference character $V_{tg}$ designates an input to the transfer gate 102.

Figure 2A:
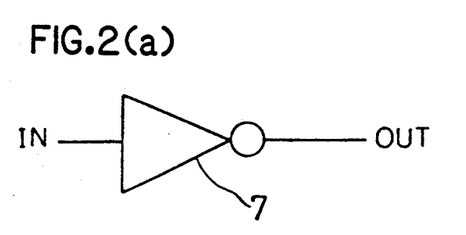
Figure 2B:
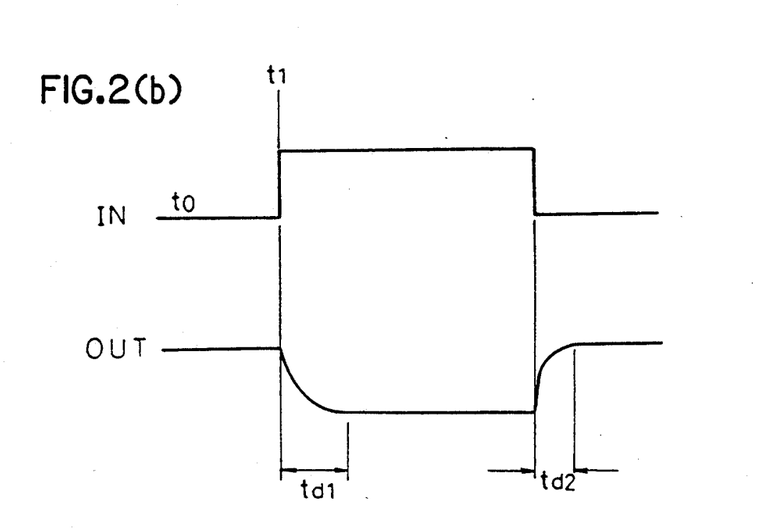
FIG. 2(b) is a step input signal and the output waveform of an inverter in response to the input signal of FIG. 2(b) used in a CCD imager according to an embodiment of the invention.
Figure 3:
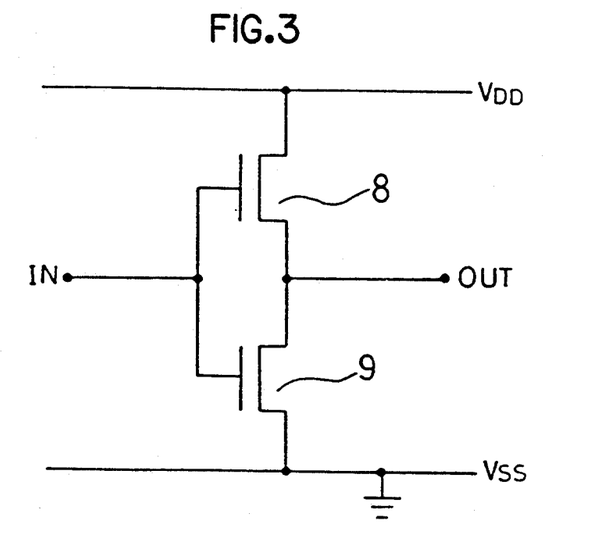
FIGS. 3, 4(a), and 4(b) are circuit diagrams showing inverters used in a CCD imager according to an embodiment of the invention.
Figure 4A:
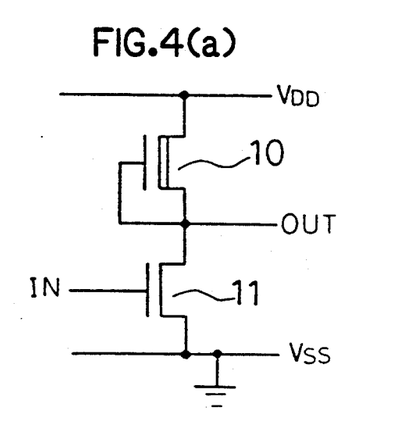
Figure 4B:
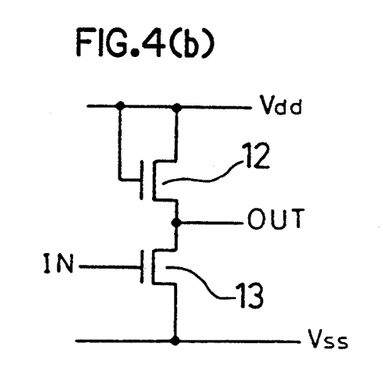

FIG. 2(a) shows a schematic diagram and FIG. 2(b) shows a delay operation waveform of an inverter used in the CCD imager of the first embodiment of the present invention. FIGS. 3, 4(a) and 4(b) show inverter circuits which are used in the embodiment. FIG. 3 shows a ratioless inverter 7 constituted by a P channel transistor 8 and an N channel transistor 9. FIG. 4(a) shows an N (or P) channel MOS ratio inverter constituted by a depletion N (or P) channel transistor 10 and an enhancement N (or P) channel transistor 11 and FIG. 4(b) shows an N (or P) MOS ratio inverter constituted by an enhancement N (or P) channel transistor 12 and an enhancement N (or P) channel transistor 13. In these figures, the same reference numerals as those in FIGS. 5 to 11(a) designate the same or corresponding portions.

Usually, the input/output characteristics of the inverter 7 has a time delay in the output relative to a step input. That is, as shown in FIG. 2, if time delays are represented by $t_{d1}$, $t_{d2}$, these time delays, $t_{d1}$, $t_{d2}$ can be represented by charge/discharge characteristics of the load capacitance on the switching of MOS transistors.

For example, in a case of ratioless inverter using the depletion transistor shown in FIG. 4(a), the time delays $t_{d1}$, $t_{d2}$ are approximated as $$t_{d1} = 4 C_L/\beta_D V_{DD} \tag{1}$$

$$t_{d2} = 4 C_L/\beta_L V_{DD} \tag{2}$$

(Reference: J. Meyber et al., translated by Takuo Sugano et al., "Introduction of MOSLSI design", by Sangyo Tosho, 1984, pp. 58 to 65.).

Here, $C_L$ designates the capacitance produced between the output terminal (OUT) and the ground terminal, $\beta_D$ designates the gain of the enhancement type N (or P) channel transistor 11, and $\beta_L$ designates the gain of the depletion type N (or P) channel transistor 10.

The above-described gains $\beta_D$, $\beta_L$ depend on the configuration of the channel of the transistor. When the channel length is L and the channel width is W, the gains respectively:

$$\beta_D = \mu_N C_o(W_D/L_D) \tag{3}$$

$$\beta_L = \mu_N C_o(W_L/L_L) \tag{4}$$

Here, the subscripts $D, L$ of the gain $\beta$ means driving transistor and load transistor, respectively.

In addition, $\mu_N$ and $C_o$ designate the mobility of electrons in the inverted layer and the capacitance of the gate insulating film, respectively. In addition, $W_D$ and $W_L$ designate channel widths and $L_D$ and $L_L$ designate the channel lengths of the transistors 11 and 10, respectively.

When the time delays $t_{d1}$, $t_{d2}$ are calculated by using typical values, the following are obtained:

$$\mu_N = 8 \times 10^{-2} m^2 V^{-1} S^{-1}$$

$$C_O = 8.5 \times 10^{-4} Fm^{-2}$$

$$C_L = 0.1 \times 10^{-12} F$$

$$V_{DD} = 5V$$

When
$W_D/L_D = 1$, $W_L/L_L = 1$,
$t_{d1} = 2.9$ [ns], $t_{d2} = 2.9$ ns
When
$W_D/L_D = 1/5$, $W_L/L_L = 1/5$,
$t_{d1} = 14$ [ns], $t_{d2} = 14$ ns.

As described above, the time delays $t_{d1}$, $t_{d2}$ can be controlled by the configuration of channels of the transistors used in the inverters. Further, that the time delays $t_{d1}$, $t_{d2}$ be longer than the time required for the transfer of charges per stage is a condition required for the operation of the device of the present invention.

A description is given of the time required for the transfer of charges.

A Buried Channel CCD (hereinafter referred to as "BCCD") is most widely used for transferring charges. In a BCCD, charge the transfer by a fringing electric field is the most important. In accordance with a reference by Tetsuo Tsukamoto, "Fundamentals of CCD", Ohm-sha, Electronics Bunko, pp. 81, the time constant $\tau_f$ representing the degree of attenuation of charges below the gate in the transfer by a fringing electric field is represented by the following:

$$\tau_f = L^3/3.2\mu \cdot V \cdot d$$

Here, L represents transfer gate length, $\mu$ designates electron mobility, V designates clock voltage, and d represents the thickness of the insulating film.

For example, when L, $\mu$, V, and d are 7 $\mu$m, 400 cm$^2$/v.19 sec, 10 V, and 1000 Å, respectively, in the above-described formula, $\tau_f$ becomes 2.7 ns. This value is about one-fifth of the result of calculation of $t_{d1}$, $t_{d2}$ and it is possible to further increase this ratio ($\tau_f/t_{d1}(t_{d2})$) by optimizing the configurations of the transistors and the CCDs.

A description is given of the operation hereinafter.

It is apparent that the CCD imager of this embodiment can operate in a good manner from the above-described calculation.

That is, as shown in FIGS. 1(b)–1(g), at time $t_0$ before starting the charge transfer, low level and high level voltages alternatingly applied to the respective transfer gates and the charges to be transferred are present below the alternating transfer gates 3 which are at high level voltage.

At time $t_1$ when charge transfer starts, when the voltage level of the transfer gate A at the output side of the CCD register is switched to high level from low level, the charges stored below the gate B adjacent the transfer gate A start to move toward gate A and subsequently after a predetermined time $t_{d1}$ which is determined by the circuit constant of the inverter 7, when the voltage level of gate B is switched from high level to low level, the movement of charges stored gate B to the adjacent gate A is completed. Then, the above described operation is repeated with the next delay time $t_{d2}$.

By switching the transfer voltage level on the inverter sequence with a predetermined delay time, charges are sequentially transferred to the adjacent gate from the CCD output side.

As described above, in this embodiment the inverters 7 lengthen the delay time by optimizing the structure of the transistor are connected in series. The CCDs 103 are also serially connected. The outputs of the respective serially connected inverters are connected to the corresponding electrodes of the CCDs. Therefore, the transfer clock is required to provide only one trigger for the charge transfer sequence and a switching transistor, like transistor 17 of FIGS. 10 and 11(a), is not required. Therefore, the circuit is simplified and a CCD imager of high pixel density is realized.

Figure 13:
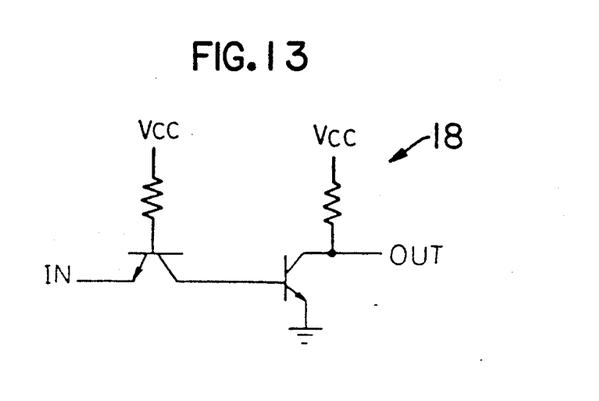
FIG. 13 is a circuit diagram showing a bipolar inverter used in a CCD imager according to an embodiment of the invention.

In the above-described embodiment a ratio-type inverter shown in FIG. 4(a) is used as an inverter, but a ratio-type inverter shown in FIG. 4(b) or a non-ratio type inverter shown in FIG. 3 or a bipolar type inverter, like inverter 18, shown in FIG. 13 can be used with the same effects.

In the above-described embodiments a buried type CCD is described but a surface channel type CCD can be also used in the present invention.

As is evident from the foregoing description, according to the present invention, a plurality of inverters are serially connected as delay circuits and are connected in parallel to the respective gate electrodes of the charge storage and transfer devices. The delay time of the inverter is longer than the time required for the transfer of charges per one stage. Therefore, switching transistors are dispensed with and only one driving clock is required. Therefore, the circuit construction is simplified and a CCD imager appropriate for high integration is obtained.

What is claimed is:

1. A CCD imager comprising:

a plurality of photoresponsive elements producing signal charges in response to incident light;

a plurality of scanning charge transfer elements, each scanning charge transfer element including a gate electrode, for receiving signal charges from said photoresponsive elements and for transferring the signal charges between adjacent charge transfer elements in response to a transfer signal applied to said gate electrode; and a plurality of inverter circuits, each inverter circuit having an input terminal for receiving an input signal and an output terminal, each inverter producing an inversion of the input signal at the output terminal, said inverter circuits being serially connected, output terminal to input terminal, the respective output terminals of each of said inverter circuits being connected to a corresponding gate electrode of one of said scanning charge transfer elements.

2. The CCD imager as defined in claim 1 including means for applying high and low level signals to said inverter circuits wherein when the level of the input signal applied to said inverter circuits switches between high and low levels, charges are transferred between adjacent scanning charge transfer elements with a predetermined delay time determined by circuit constants of said inverter circuits.

3. The CCD imager as defined in claim 2 wherein the delay time of each of said inverter circuits is longer than the time required for the transfer of charges between adjacent scanning charge transfer elements.

4. The CCD imager as defined in claim 1 wherein at least one of said inverter circuits is a ratio inverter.

5. The CCD imager as defined in claim 1 wherein at least one of said inverter circuits is a ratioless inverter.

6. A CCD imager comprising:

a plurality of photoresponsive elements producing signal charges in response to incident light;

a plurality of scanning charge storage and transfer elements, each scanning charge storage and transfer element including a gate electrode, for receiving and storing signal charges from said photoresponsive elements and for transferring stored signal charges between adjacent charge transfer elements in response to a transfer signal applied to said gate electrode; and a plurality of delay circuits, each delay circuit having an input terminal and an output terminal, said delay circuits being serially connected, output terminal to input terminal, the respective output terminals of each of said delay circuits being connected to a corresponding gate electrode of one of said scanning charge transfer elements.

7. The CCD imager as defined in claim 6 including means for applying high and low level signals to said delay circuits wherein when the level of the input signal applied to said delay circuits switches between high and low levels, charges are transferred between adjacent scanning charge transfer elements with a predetermined delay time determined by circuit constants of said delay circuits.

8. The CCD imager as defined in claim 7 wherein the delay time of each of said delay circuits is longer than the time required for the transfer of charges between adjacent scanning charge transfer elements.

9. The CCD imager as defined in claim 6 wherein at least one of said delay circuits is a ratio inverter.

10. The CCD imager as defined in claim 6 wherein at least one of said delay circuits is a ratioless inverter.

11. The CCD imager as defined in claim 6 wherein each delay circuit is an inverter circuit receiving an input signal at the input terminal and producing an inversion of the input signal at the output terminal.

* * * * *